US009843920B2

United States Patent
Scarr et al.

(10) Patent No.: US 9,843,920 B2
(45) Date of Patent: Dec. 12, 2017

(54) MONITORING TRANSPORT SYSTEMS NETWORK TRAFFIC USING MOBILE COMMUNICATIONS NETWORK USAGE RECORDS

(71) Applicants: Vodafone IP Licensing Limited, Newbury, Berkshire (GB); International Business Machines Corporation, Armonk, NY (US)

(72) Inventors: Kevin Tristan Scarr, Newbury (GB); David Pollington, Newbury (GB); Nichola Jane Inglis Hickman, Newbury (GB); Damian Frederick Brennan, Winchester (GB); Daniel Richard Mays, Winchester (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 930 days.

(21) Appl. No.: 13/725,577

(22) Filed: Dec. 21, 2012

(65) Prior Publication Data

US 2013/0183927 A1 Jul. 18, 2013

(30) Foreign Application Priority Data

Dec. 21, 2011 (GB) .................................. 1121956.5

(51) Int. Cl.
| | | |
|---|---|---|
| H04M 11/00 | (2006.01) |
| H04W 8/02 | (2009.01) |
| G08G 1/01 | (2006.01) |
| H04W 4/02 | (2009.01) |
| H04W 4/04 | (2009.01) |

(52) U.S. Cl.
CPC .............. *H04W 8/02* (2013.01); *G08G 1/012* (2013.01); *H04W 4/028* (2013.01); *H04W 4/046* (2013.01)

(58) Field of Classification Search
None
See application file for complete search history.

(56) References Cited

U.S. PATENT DOCUMENTS

| | | | |
|---|---|---|---|
| 6,650,948 B1 | 11/2003 | Atkinson et al. | |
| 7,764,231 B1 * | 7/2010 | Karr ........................ | G01S 1/026 342/450 |

(Continued)

FOREIGN PATENT DOCUMENTS

| | | |
|---|---|---|
| DE | 10225033 | 12/2003 |
| WO | WO 01/01367 A1 | 1/2001 |

OTHER PUBLICATIONS

John Doyle, Peter Hung, Damian Kelly, Sean McLoone and Ronan Farrell, "Utilising Mobile Phone Records for Travel Mode Discovery", Jun. 23-24, 2011, ISSC 2011, Trinity College Dublin.*

(Continued)

Primary Examiner — German J Viana Di Prisco
(74) Attorney, Agent, or Firm — Workman Nydegger

(57) ABSTRACT

Method and system of detecting traffic in a transport network comprising obtaining network usage records from a mobile network. Extracting cell information from the network usage records. Identifying the network usage records originating from moving handsets from the extracted cell information. Matching the identified network usage records with one or more transport routes. Matching each of the one or more transport routes with a transport mode using transport mode map data.

18 Claims, 5 Drawing Sheets

(56) References Cited

U.S. PATENT DOCUMENTS

| | | |
|---|---|---|
| 8,064,925 B1 | 11/2011 | Sun et al. |
| 2005/0079878 A1 | 4/2005 | Smith et al. |
| 2006/0293046 A1 | 12/2006 | Smith |
| 2010/0179756 A1* | 7/2010 | Higgins ................. G01C 21/20 701/414 |
| 2010/0292921 A1* | 11/2010 | Zachariah .............. G06Q 50/30 701/533 |
| 2011/0124334 A1* | 5/2011 | Brisebois .............. H04W 48/16 455/434 |
| 2013/0130693 A1* | 5/2013 | Salvador ............... H04W 48/20 455/437 |

OTHER PUBLICATIONS

GB Search Report for GB1121956.5 dated Apr. 17, 2012.
Calabrese et al.; "Real Time Urban Monitoring Using Cell Phones: A Case Study in Rome"; IEEE Transactions on Intelligent Transportation Systems; vol. 12; Mar. 2011 (USA); pp. 141-151.
European Search Report for 12275215.7 dated Jul. 5, 2013.
Quang Tram Minh and Eiji Kamioka: "Traffic State Estimation with Mobile Phones Based on the 3R Philosophy", IEICE Transactions on Communications, Communications Society, Tokyo, JP, vol. E94-B, No. 12, Dec. 1, 2011 (Dec. 1, 2011), pp. 3447-3458, XP001572002, ISSN: 0916-8516, DOI: 10.1587/TRANSCOM. E94.B.3447 *abstract* p. 3448, left-hand column, last paragraph—p. 3451, right-hand column, last paragraph; figures 1,3,5 *.

* cited by examiner

MONITORING TRANSPORT SYSTEMS NETWORK TRAFFIC USING MOBILE COMMUNICATIONS NETWORK USAGE RECORDS

CROSS REFERENCE TO RELATED APPLICATIONS

This application claims priority to United Kingdom Application Number 1121956.5, filed on Dec. 21, 2011, the entirety of which is incorporated herein by reference.

FIELD OF THE INVENTION

The present invention relates to deriving information about a transport system from network usage records.

BACKGROUND OF THE INVENTION

Detecting and monitoring traffic within a transport network can require CCTV networks, ticketing information, inductive loops to detect vehicles or survey data. However, these techniques are expensive to set up, lack accuracy and cannot effectively determine when an individual has changed from one mode of transport to another during a particular route or journey. Other techniques for monitoring travel patterns use GPS receivers within mobile devices ("Real-Time Urban Monitoring Using Cell Phones: a Case Study in Rome"—Calabrese, F., Ratti, C., Colonna, M., Lovisolo, P., and Parata, D. IEEE Transactions on Intelligent Transportation Systems, 12(1), 141-151, 2011). Whilst this can provide very accurate results, many travellers do not habitually carry a GPS receiver and even when they do it may be deactivated most of the time due to limited battery life. Therefore, the number of journeys monitored may be low and reduce accuracy or wide scale monitoring.

Mobile operators may collect network usage records (NUR) that contains information about call events including telephone calls, SMS and mobile data retrieval. The NUR data include information about where the call was initiated and terminated, its duration and the parties (or telephone numbers) involved in the particular event. These data may be used by a billing system to account for events initiated by a subscriber using a handset.

"Transportation Mode Inference from Anonymized and Aggregated Mobile Phone Call Detail Records"—Huayong Wang, Francesco Calabrese, Giusy Di Lorenzo, Carlo Ratti: 13th IEEE International Conference on Intelligent Transportation Systems, September 2010, describes using mobile phone call detail records (a particular type of NUR) to estimate a particular transportation mode share for a particular origin and destination and how this changes over time. The described system may be used to investigate the particular modes of transport that a group of travellers (with an active mobile phone) use between two particular points. This is achieved by determining how fast a traveller was travelling between these two set points and from this calculated speed, determine the likely mode of transport that was used. However, this method cannot determine between modes of transport that operate with similar speeds. Furthermore, particular start and end points must be defined and only modes of transport between these exact points are considered. Therefore, this system is limited to journeys with well defined start and end points. The system also required manual filtering and analysis of particular data records in order to achieve sensible results.

Therefore, there is required a method that overcomes these problems.

SUMMARY OF THE INVENTION

Against this background and in accordance with a first aspect there is provided a method of detecting traffic in a transport network comprising the steps of: obtaining network usage records, NUR, from a mobile network; extracting cell information from the network usage records; identifying the network usage records originating from moving handsets from the extracted cell information; matching the identified network usage records with one or more transport routes; and matching each of the one or more transport routes with a transport mode using transport mode map data. Therefore, NUR records may be used to infer usage of known transport routes. This information may be further used to develop a picture of how different transport routes or modes are used when users of mobile devices such as cell phones, travel from one place to another especially when such journeys are formed from several different sections. Such a picture provide greater coverage than that developed from survey data or by focussing on individual transport routes such as investigating ticketing data for example. Traffic may include individuals, groups, congestion, throughput or travellers, utilisation of particular transport facilities as well as other transport related measures. NUR may be records that describe how a network element such as a switch, for example, handles an event (such as a call). Amongst other things, the NUR may contain information necessary to enable a user to be correctly billed.

Preferably, the network usage records record mobile events and the extracted cell information may include cellular base station identifiers and identifying network usage records originating from moving handsets further comprises determining changes in cellular base station identifiers during mobile events. Cellular base station identifiers may be identifiers for the device itself or location identifiers. Cellular base stations or their locations may have unique identifiers and be recorded in NUR data.

Preferably, the mobile events may be selected from the group consisting of: call; SMS; cell change; MMS; USSD; IMSI; and data download. Other events or event types may be used and recorded in NUR records.

Optionally, matching the movement of identified network usage records with one or more transport routes may further comprise comparing the locations of cellular base stations recording in the indentified network usage records information with predetermined transport routes. Such predetermined or known transport routes may be centrally stored or obtained from separate sources such as published timetables or databases, for example. Greater location accuracy or resolution may be achieved by determining a sphere of reception of a cellular base station. Several 'location tiles' next to a cellular base station may be defined using timing, triangulation or other technologies. Therefore, the location of the mobile device may be matched against one 'location tile' out of several associated or the cellular base station.

Optionally, the predetermined transport routes maybe scheduled transport routes. This may include road, train, underground, tram, bus or air routes amongst others. Unscheduled transport routes may also be predetermined such as travel on road segments, for example.

Optionally, the transport routes may be defined by timetables or road segments.

Optionally, the method may further comprise the step of optimising the transport network based on the matched transport routes and any one or more of: transport route volume; transport route utilisation; transport route congestion; direction of travel; and transport route time of use. Therefore, the method may be used to improve, alter or adjust existing or planned transport facilities. This may be in real-time, near real-time or using stored or archive data.

Optionally, the method further comprises the step of detecting traffic flow within the matched transport route by determining the volume of moving handsets on the matched transport route from the network usage records. As a large proportion of travellers carry a mobile device such as a cell phone and this proportion can be measured or verified then monitoring the movement of such devices or a group of such devices may provide a reliable indication of traffic flow. Furthermore, as the mobile device will stay with a traveller then a change of transport mode may also be detected on route during a particular journey or set of journeys.

Optionally, the method may further comprise the step of matching each of the transport routes with a transport mode using transport mode map data. Each route may have a particular mode. Therefore, the usage of such transport mode or modes may be detected and analysed.

Preferably, the transport mode may be selected from the group consisting of: bus; train; automobile; coach; walking; cycling; light rail; underground train; and tram. Other modes may be used.

Optionally, the method may further comprise the step of determining origins and destinations of moving handsets from the network usage records. Such origins and destinations may be determined by finding a usual or most common handset location at particular times of day or determine a high or largest proportion of events coming from the same, close by or neighbouring cell locations, for example.

Optionally, the method may further comprise the step of predicting a future utilisation of the matched transport routes using timing information within the network usage records. Other planning or optimisation may be carried out.

Preferably, the NUR may be real-time, near real-time or stored data. Real-time data may be acquired by detecting or sampling network event data. Aggregation of such acquired data may be used and combined with historic data.

Optionally, the method may further comprise the step of obtaining a distance travelled and a call duration from the identified network usage records.

In accordance with a second aspect there is provided a method of managing a transport network comprising the steps of: obtaining network usage records from a mobile network; extracting cell information from the network usage records; identifying the network usage records originating from moving handsets from the extracted cell information; and matching the identified network usage records with one or more transport routes. In response to the matched transport routes, the transport network may be managed by alteration or optimisation including but not limited to reducing transit time and congestion and increase network capacity and efficiency. For example, an increase in transport capacity may be made for higher used routes at particular times of increase use. Road works and other maintenance actions may be scheduled for low use periods. Furthermore, predictions or calculations of use for future or planned additional routes may be made based on the number or density of travellers using existing routes (e.g. the expected use of a proposed rail network running close to a road or motorway).

Preferably, the network usage records may be selected from the group consisting of: call detail records, event detail records; IP detail records; usage detail records; and xDR records.

The method described above may be implemented as a computer program comprising program instructions to operate a computer. The computer program may be stored on a computer-readable medium.

Furthermore, the method may be implemented as a computer program operating on a computer system such as a network, server or group of servers with suitable memory storage and database resources.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale.

DETAILED DESCRIPTION OF THE PREFERRED EMBODIMENTS

Figure 1:
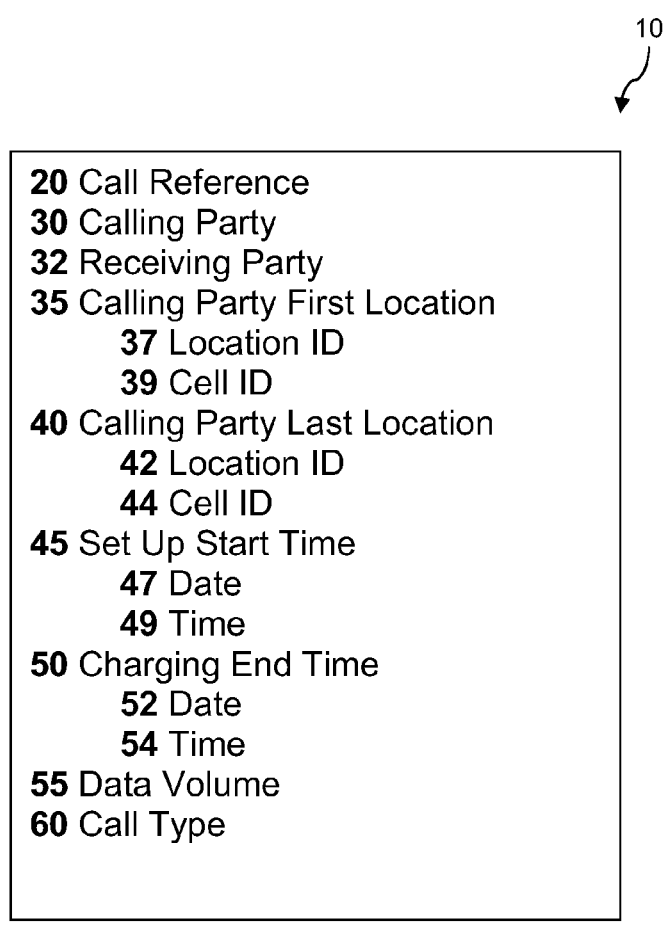
FIG. 1 shows an example file structure of a network usage record.

FIG. 1 shows an example file structure of a network usage records (NUR) 10 indicating some of the data fields that may be present in such a record. Other data fields may be present or the data fields may have different names or structure. The call reference 20 provides an identifier for the NUR record. The calling party 30 is an identifier for the mobile device and may be the device's or SIM's telephone number, for example. The receiving party field 32 indicates the destination of the call. The calling party first location 35 contains two subfields 37 and 39 indicating the location ID and cell ID specifying details of where the call is initiated. Similarly, the calling party last location 40 contains two subfields 42 and 44 specifying the location ID and cell ID where the call was terminated. Where the calling party is moving between cells during a call the first location and last location may be different. The set up start time 45 contains subfields date 47 and time 49. Charging end time 50 defines the date 52 and time 54 at the end of the call. Data volume 55 indicates how much data was transmitted and/or received if this was a data call. Such a field may be absent or blank for non-data calls. Field 60 describes the call type which may be a voice call, an SMS or a data transfer, for example. Other call types may be included.

Although the term "call" has been used, this may be a generic term to describe an event that may occur or be provided to a mobile device such as a cell phone. Other events may be stored within NUR records. For example, an active mobile device moving between cells may have this handover recorded even though no call is made during this handover. Nevertheless, such an event or set of events may be used to determine the location and speed of a particular mobile device. Furthermore, average journey times for particular routes or sets of routes may be determined from analysing many events as recorded in NUR records.

Where the calling party first location 35 and calling party last location 40 are different locations, then this indicates that the mobile device has moved during the call. Other cell IDs may be stored within the NUR indicating handoff between different cells during the call in addition to the first and last locations. The set up start time 45 and charging end time 50 may be used to determine the call duration. As the location IDs typically relate to fixed locations of cell base stations and these may be known from a database of such locations, then the distance travelled during the call by the mobile device (or an estimation of this distance) together with the duration of the call may be used to calculate travel speed or average travel speed during the call. As the density of cells increases so may the accuracy of the calculated travel speed. However, even for spaced apart cells a suitable approximation of travel speed may be derived. Under certain circumstances a mobile device may not use the closest cell. Therefore, certain cells may have different or overlapping coverage and this may be taken in to account when determining the location and travel speed of a mobile device. For example, such a situation may be determined when a mobile device hands over between non-neighbouring cells.

Figure 2:
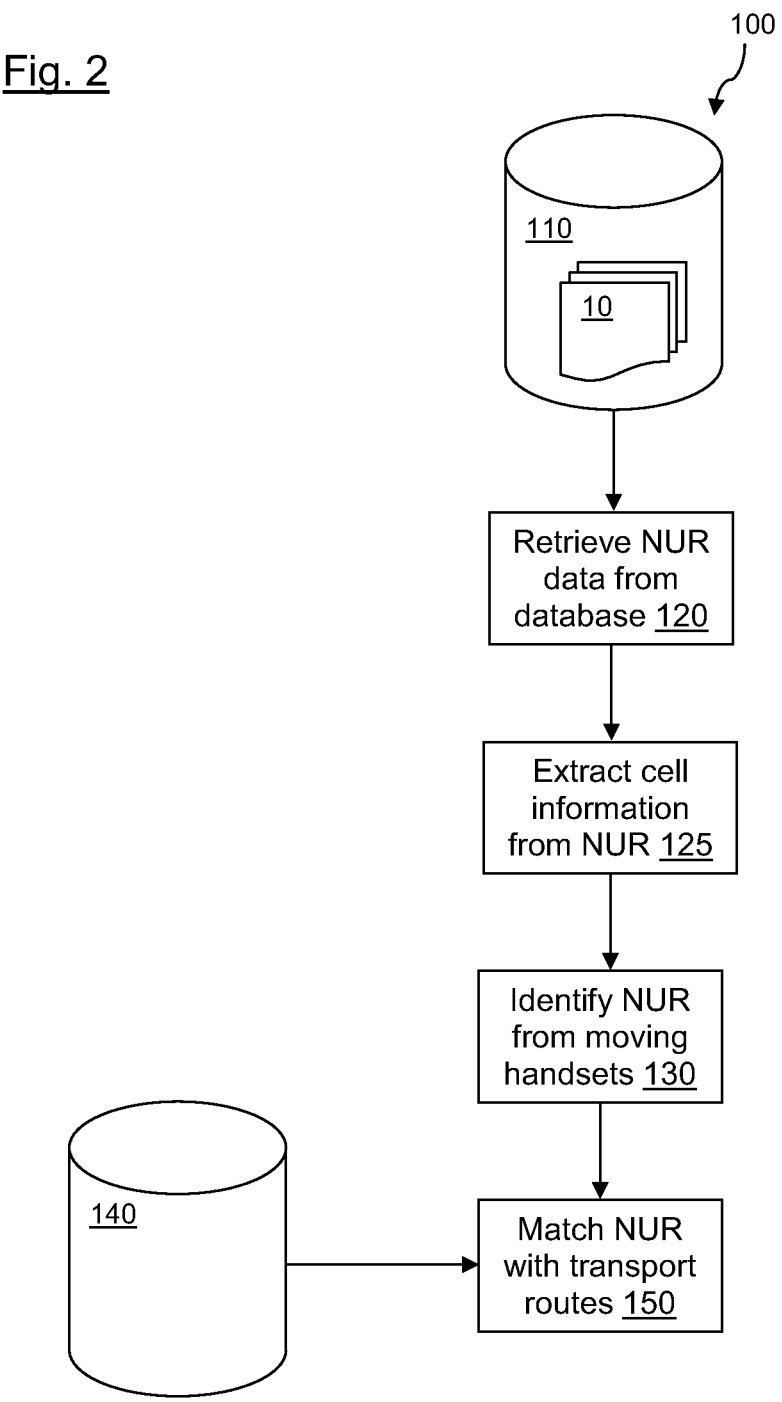
FIG. 2 shows a flow chart illustrating a method of detecting traffic in a transport network, given by way of example only.

FIG. 2 shows a flow diagram of a method 100 for detecting traffic in a transport network. The method 100 results in matching NUR records with transport routes. This method 100 is illustrated in high level terms in FIG. 2, which shows only the main steps but does not show particular implementations of these steps, which are shown in detail in further figures. A database 110 contains a plurality of NUR records 10. This NUR database 110 may be populated by a mobile network or contained within such a network (not shown in this figure). At step 120, NUR data are retrieved from the database 110. Cell information is extracted from the NUR records at step 125. This cell information may include cell ID and/or cell location ID. At step 130, a subset of NUR records is identified for those records that relate to handsets that moved during a call. For example, this may be the subset of NUR records that have different calling party first locations 35 to calling party last locations 40. In other words, NUR records 10 that have the same first and last locations are ignored or filtered out. A transport database 140 contains details of transport routes that may be used to match particular NUR records 10 with individual transport routes at step 150. For example, the location of points on a route or vectors defining particular routes may be stored in the transport database 140. The speed of travel in a route may also be stored against particular sections of a route in the transport database 140. Therefore, the matching step 150 may use the extracted cell information obtained at step 125 to calculate a speed of travel during a particular call event that may correspond to a particular route or route segment stored in transport database 140 having the same or similar locations, i.e. matching cell location with route location details.

Figure 3:
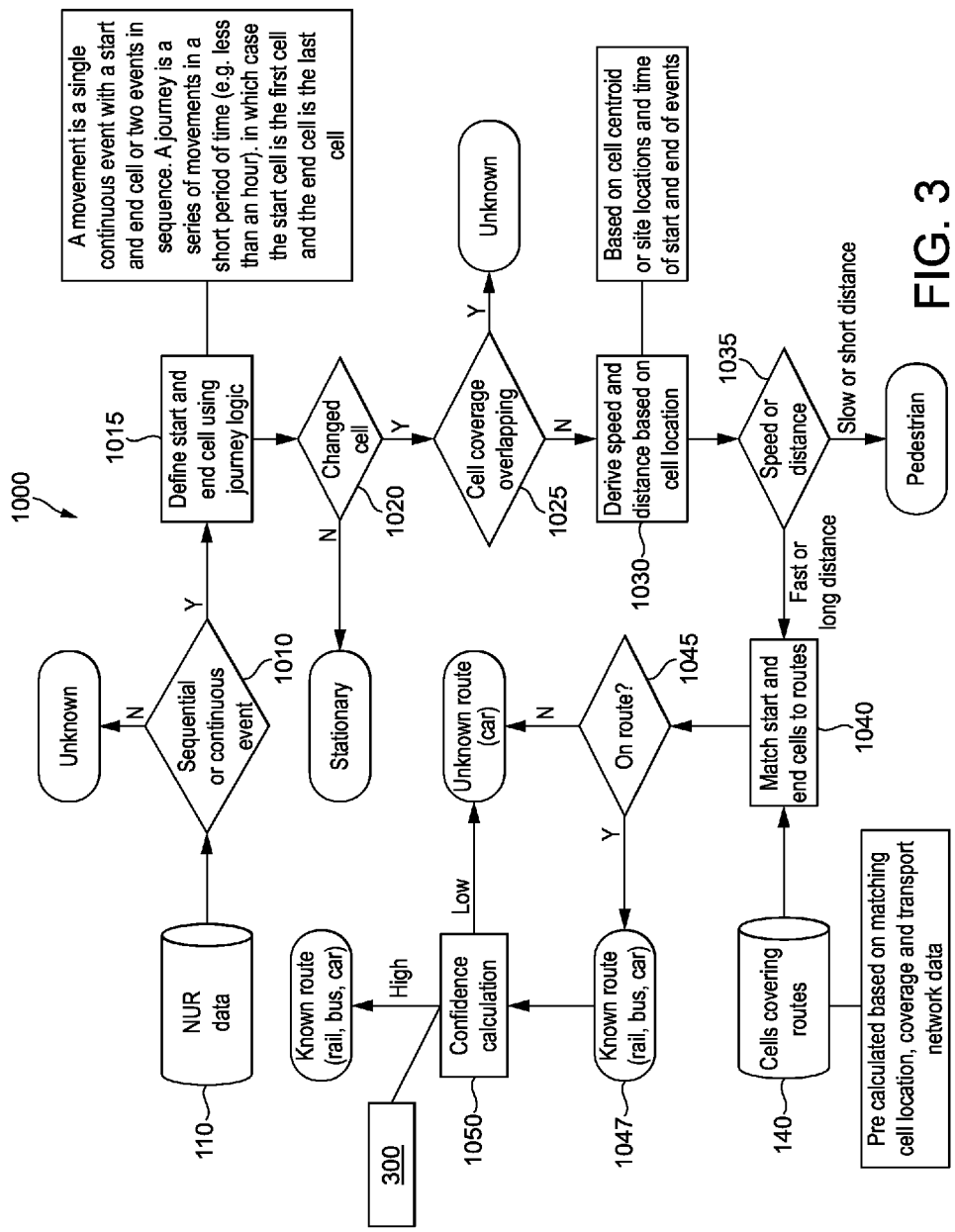
FIG. 3 shows a more detailed flow chart illustrating the method of FIG. 2.

FIG. 3 shows a flowchart of a method 1000 for detecting traffic in a transport network similar to method 100 described in FIG. 2, but showing more detail and including more detailed logical procedures or steps that may be carried out. However, whilst FIG. 3 shows more detail, other steps may be used as well but are omitted from this figure, for clarity.

NUR data 110 are analysed at step 1010 to determine which NUR data records relate to sequential or continuous events. In other words, this step 1010 determines whether the originating mobile device produced a series of NUR records 10 defining a single event or one NUR record 10 providing details of a continuous event. Step 1015 defines and extracts a start and end cell. A movement may be a single continuous event having a start and end cell (or two or more events in sequence). A journey may be defined as a series of movements in a short period of time (e.g. less than an hour), in which case, the start cell may be the first cell and the end cell may be the last cell.

Step 1020 determines whether the cell ID and/or cell location changed during the event. If not, then the device is determined to be stationary and the NUR record 10 is not considered further or filtered out. At step 1025, it is determined whether the cell coverage between the first cell and end or last cell overlaps. Where there is an overlap, then the NUR record 10 is excluded as this may be due to a stationary mobile device. At step 1030, speed and distance values may be derived based on cell location that may be extracted from the NUR record 10 or by looking up cell locations from a cell database. For example, an event lasting one minute and having a first cell location and last cell location (or their coverage centres) 1 km apart will be deemed to be derived from a mobile device travelling at 1 km/min or 60 km/hr.

At step 1035, a filter may be applied to remove short distance changes or slow moving devices. For example, a predetermined speed or distance may be used to filter out NUR records 10 relating to calls made by pedestrians. For those moving events meeting or exceeding such predetermined thresholds, then matching of start and end or last cells to routes is carried out at step 1040. Transport database 140 may contain precalculated routes based on matching known cell locations, coverage and transport network data and this information may be used during the matching step 1040. Step 1045 determines whether the event occurred on a known route or an unknown route. For known routes 1047, a confidence checking calculation 1050 may be applied (if required) to provide a confidence level for each result or match. This procedure is described in further detail in relation to a confidence checking method 300 described with reference to FIG. 5. A threshold may be applied to the confidence level. Records meeting or exceeding such a confidence threshold may be retained or considered in further analysis, whereas records that do not meet such a threshold may be discarded. The threshold may be adjusted as necessary.

Figure 4:
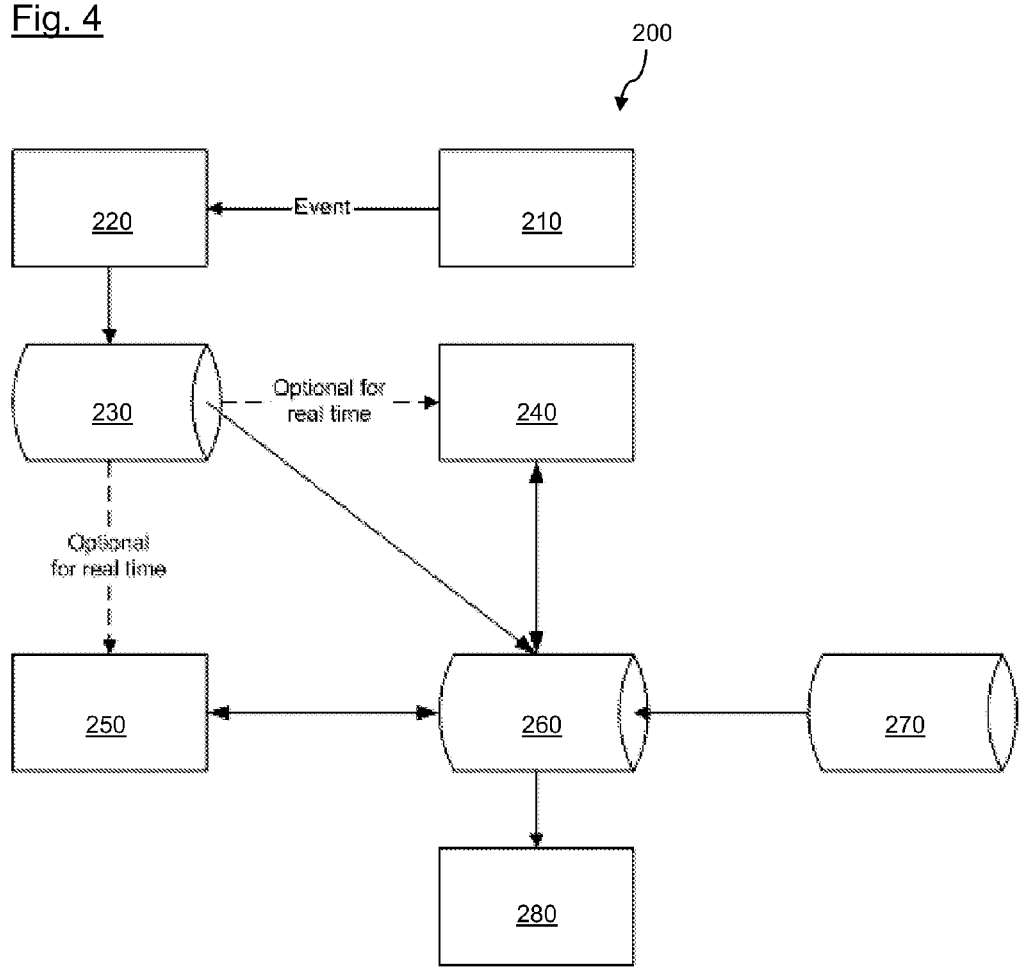
FIG. 4 shows a schematic diagram of a system used to implement the method of FIG. 2 or 3.

FIG. 4 shows a schematic diagram of system components used to implement the described methods. These components form a system 200 including a mobile device 210 that may be used to initiate an event by communicating with a base station or cell 220, which generates live data stored on database 230. The live data may be archived in a data warehouse 260. A central processor 240 processes data from database 230 and data warehouse 260 to execute computer programs or algorithms that run the described methods. Additional database 270 may provide additional data that may include the transport database 140 (described with reference to FIG. 2) that contains details of transport routes used during the matching procedure. An additional central processor unit 250 may execute other analytical procedures or algorithms that are not described in detail here. A display unit or output unit 280 may provide visualisation of the method results or provide an application programming interface so that such results may be used by other programs. The processors and databases may be formed from a network or contained within logical or physical servers operating on suitable operating systems such as UNIX, Windows® or Linux, for example. The databases may use Oracle, SQL Server or DB2, for example.

Figure 5:
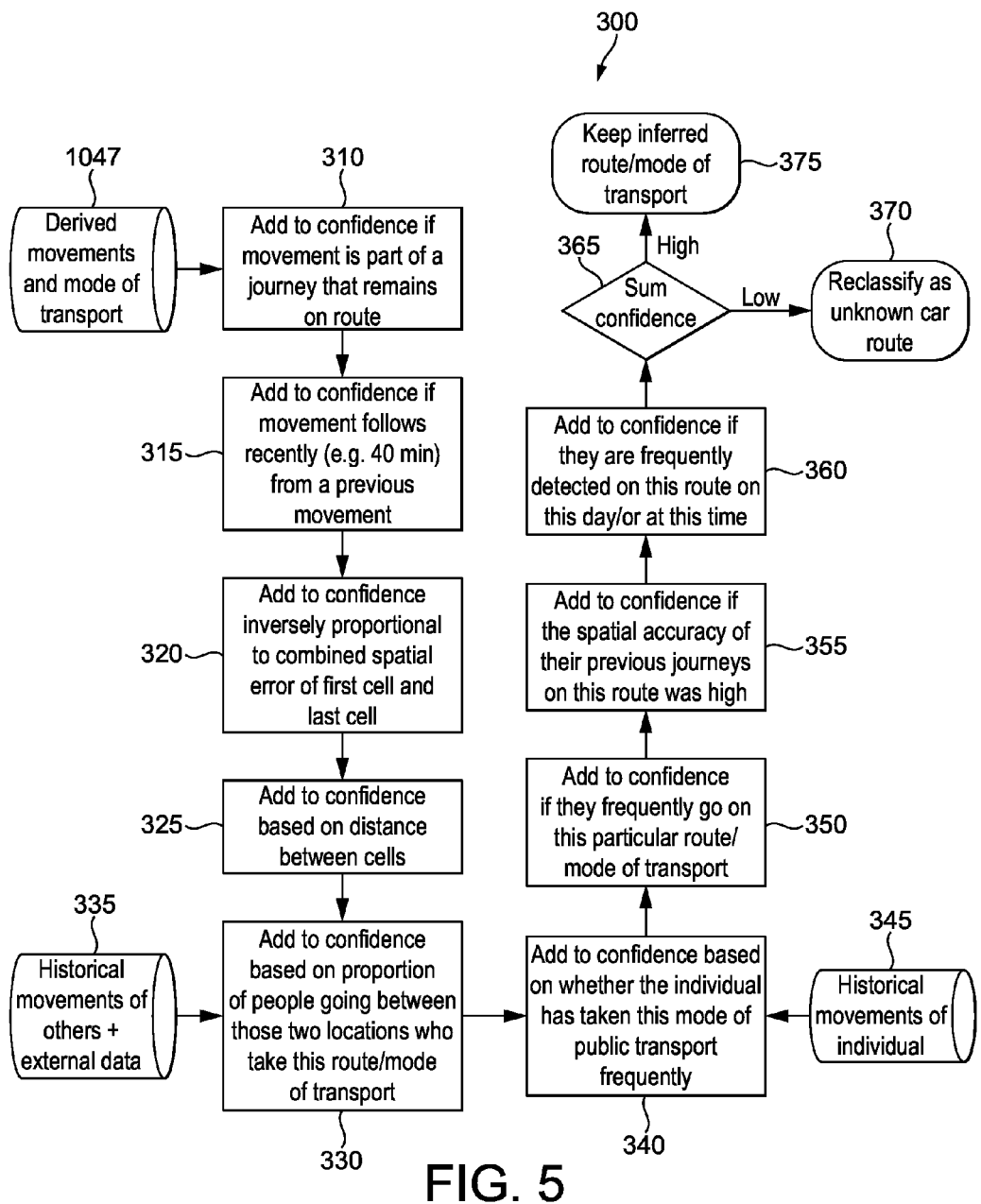
FIG. 5 shows a flow chart of a method used to provide a confidence level of results produced from carrying out the methods of FIG. 2 or 3.

FIG. 5 shows a flowchart illustrating the confidence checking method or algorithm 300 described with reference to FIG. 3. The known routes or derived movements and modes of transport 1047 are provided to the algorithm 300. The following steps are used to calculate a confidence measure or metric resulting in an overall confidence level. At step 310, confidence is added if it is determined that a particular journey remains on a known route. Step 315 adds to the confidence level if the detected movement is close in time to a previous movement. Confidence is inversely proportional to a combined spatial area of the first cell and last cell. Therefore, confidence may be reduced at step 320, which calculates such a spatial area. At step 325, confidence is increased or added based on distance between cells. A database 335 contains historical movements of other mobile device users as well as external data. Therefore, step 330 adds to the confidence level depending on a proportion of people going between the same or similar locations identified for the particular record under consideration who take this particular route and mode of transport.

Database 345 contains historical movements for particular individuals. Therefore, confidence is increased based on whether the particular individual has taken this mode of transport frequently as defined by thresholds or other techniques. Similarly, the confidence rate is increased at step 350 if the particular user frequently (again, as compared with a threshold to define "frequent" or "infrequent") uses this particular mode or route of transport. Step 355 increases the level of confidence if the determined spatial accuracy of a particular user's previous journeys on this route was high. Confidence is also increased at step 360 if the particular user is detected or known from historical movements on the particular route on this day or time of day. At step 365, a sum of all the confidence levels determined by the previous steps may be made. When a confidence sum is high, then the particular inferred route/mode of transport is kept or retained in a database at step 375. For low confidence levels, then steps 370 reclassifies or rejects the particular derived movement or mode of transport. In this way, matched network usage records with particular transport routes may be filtered by applying particular confidence thresholds to those matched data. Increasing the number of records analysed and filtering out lower confidence level results will therefore improve reliability and accuracy. The various thresholds and comparison data used to calculate confidence may be tuned or adjusted based on feedback from external checking mechanisms with the aim to reduce the number of rejected but accurate results or to reduce the number of inaccurate results that are admitted into the retained set.

Following the matching procedure and filtering of unreliable results, a picture of how different transport routes and modes of transport are used from day to day and at particular times of the day may emerge from the data. This picture may be viewed directly in visual form using the display unit 280. Other uses may be made of these data. For example, the data may indicate that particular segments or transport routes and modes are under or over utilised. Therefore, a capacity alternation to the transport network may be made in response (e.g. widening a road or increase the number of trains per hour on a rail route). Other uses may include town planning and metrics generation. Furthermore, improved links between different modes of transport may be made when the data indicate that a large number of travellers change transport mode at a particular point (e.g. moving bus stops or stations). The transport network or networks may also be modelled using the output from the methods described above.

Secondary facilities may be provided at points where the data indicate that a high proportion of travellers eventually end up their journeys. For example, travel or other information regarding popular destinations may be provided at popular origins. This may include weather, event indications (e.g. concerts), more relevant advertising, congestion, diversions or other information.

As will be appreciated by the skilled person, details of the above embodiment may be varied without departing from the scope of the present invention, as defined by the appended claims.

For example, the NUR records may contain other information. This may include GPS or other location data obtained from the mobile device and recorded at various stages and times during a call.

NUR records may include call detail records (CDR) generated, recorded and stored for particular events especially related to calls and SMS transmissions. For data events the NUR records may be xDR records generated for similar purposes. In other words, specific implementations of the methods and systems described throughout may use CDR and/or xDR data as the network usage records. Furthermore, NUR may include event records other than CDR and/or xDR data.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. In a mobile network comprising one or more handsets, one or more base stations, and one or more databases, a method of detecting traffic in a transport network, the method comprising:
   querying at least one of the databases for network usage records (NUR), the databases being configured to maintain continually updated data regarding each handset that is within a coverage area of at least one of the base stations disposed in the transport;
   identifying, from the plurality of NUR, a particular network usage record that corresponds to a moving handset,
      wherein a handset is characterized as moving when a corresponding network usage record includes records from multiple cellular base stations, and
      wherein the handset is excluded from being characterized as moving when cell coverage overlaps between a starting cellular base station and an ending cellular base station;
   matching the particular network usage record of the moving handset with one or more transport routes, the matching including calculating a plurality of different confidence levels each based on different criteria for the one or more transport routes, at least one of the criteria comprising historical movement data for the handset, wherein the plurality of confidence levels are summed together to provide a combined likelihood that the moving handset will follow a particular transport route;

identifying each cellular base station that was recorded in the particular network usage record and determining a location of each identified cellular base station;

based at least partially on the one or more transport routes and the location of each identified cellular base station, identifying a mode of travel for the moving handset, and generating a visual display that provides an indication of how different transport routes and modes of transport are used.

2. The method of claim 1, wherein the particular network usage record includes information corresponding to mobile events, and wherein the method further includes:

extracting cell information from the particular network usage record, the cell information including cellular base station identifiers.

3. The method of claim 2, wherein the mobile events are selected from a group consisting of: call; SMS; cell change; MMS; USSD; IMSI; and data download.

4. The method of claim 1, wherein the one or more transport routes are each scheduled transport routes.

5. The method of claim 1, wherein the one or more transport routes are each defined by timetables or road segments.

6. The method of claim 1, wherein the method further comprises:

detecting traffic flow within each of the one or more transport routes by determining how many other moving handsets are also operating on each of the one or more transport routes.

7. The method of claim 1, wherein the mode of travel is selected from a group consisting of: bus; train; automobile; coach; walking; cycling; light rail; underground train; and tram.

8. The method of claim 1, wherein the method further comprises:

determining an origin and a destination of the moving handset.

9. The method of claim 1, wherein the method further comprises:

predicting a future utilisation of each of the one or more transport routes using timing information within the particular network usage record.

10. The method of claim 1, wherein the plurality of NUR are real-time, near real-time, or stored data.

11. The method of claim 1, wherein the method further comprises:

obtaining a distance travelled and a call duration from the particular network usage record.

12. The method of claim 1, wherein the method further comprises:

determining a speed of movement of the moving handset.

13. The method of claim 1, wherein the method further comprises:

obtaining historical movement data for the moving handset; and upon determining that a current transport route of the moving handset corresponds to the historical movement data, increasing a confidence level of the current transport route.

14. The method of claim 1, wherein the particular network usage record includes information corresponding to mobile events, and wherein the method further includes:

detecting a state of the moving handset, the state being either active or not active; and upon a condition in which the moving handset is not active, recording, in the particular network usage record, a handover from a first cellular base station to a second cellular base station even though the moving handset is not active.

15. The method of claim 1, further comprising identifying one or more particular segments of a transport route that is over- or underutilized.

16. The method of claim 15, further comprising making a capacity alteration to the transport network based on the identified transport route segments, and further based on the summed plurality of confidence levels.

17. One or more hardware storage devices having stored thereon executable instructions that, when executed by a processor of a computing system, cause the computing system to perform a method of detecting traffic in a transport network, the method comprising:

querying one or more databases for network usage records (NUR), the databases being configured to maintain continually updated data regarding each handset that is within a coverage area of at least one base station disposed in the transport;

identifying, from the plurality of NUR, a particular network usage record that corresponds to a moving handset, wherein a handset is characterized as moving when a corresponding network usage record includes records from multiple cellular base stations, and wherein the handset is excluded from being characterized as moving when cell coverage overlaps between a starting cellular base station and an ending cellular base station;

matching the particular network usage record of the moving handset with one or more transport routes, the matching including calculating a plurality of different confidence levels each based on different criteria for the one or more transport routes, at least one of the criteria comprising historical movement data for the handset, wherein the plurality of confidence levels are summed together to provide a combined likelihood that the moving handset will follow a particular transport route;

identifying each cellular base station that was recorded in the particular network usage record and determining a location of each identified cellular base station;

based at least partially on the one or more transport routes and the location of each identified cellular base station, identifying a mode of travel for the moving handset, and generating a visual display that provides an indication of how different transport routes and modes of transport are used.

18. A mobile network comprising: one or more cellular base stations; one or more handsets that communicate with the cellular base stations; and a computing system comprising:

a processor; one or more physical non-transitory computer readable medium having computer executable instructions stored thereon that, when executed by the processor, cause the computing system to perform the following:

querying at least one of the databases for network usage records (NUR), the databases being configured to maintain continually updated data regarding each handset that is within a coverage area of at least one of the cellular base stations disposed in a transport;

identify, from the plurality of NUR, a particular network usage record that corresponds to a moving handset, wherein a handset is characterized as moving when a corresponding network usage record includes records from multiple cellular base stations, and wherein the handset is excluded from being characterized as moving when cell coverage overlaps between a starting cellular base station and an ending cellular base station;

match the particular network usage record of the moving handset with one or more transport routes, the matching including calculating a plurality of different confidence levels each based on different criteria for the one or more transport routes, at least one of the criteria comprising historical movement data for the handset, wherein the plurality of confidence levels are summed together to provide a combined likelihood that the moving handset will follow a particular transport route;

identify each cellular base station that was recorded in the particular network usage record and determine a location of each identified cellular base station;

based at least partially on the one or more transport routes and the location of each identified cellular base station, identify a mode of travel for the moving handset, and generating a visual display that provides an indication of how different transport routes and modes of transport are used.

* * * * *